US006822060B2

(12) United States Patent
Kobayashi et al.

(10) Patent No.: US 6,822,060 B2

(45) Date of Patent: Nov. 23, 2004

(54) PROCESS FOR PRODUCING A TETRAFLUOROETHYLENE POLYMER EXCELLENT IN STRENGTH

(75) Inventors: Shigeki Kobayashi, Ichihara (JP); Jun Hoshikawa, Ichihara (JP); Kazuo Kato, Ichihara (JP); Hiroki Kamiya, Ichihara (JP); Hiroyuki Hirai, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/072,995

(22) Filed: Feb. 12, 2002

(65) Prior Publication Data

US 2002/0169265 A1 Nov. 14, 2002

(30) Foreign Application Priority Data

Mar. 26, 2001 (JP) ....................................... 2001-086829
Nov. 13, 2001 (JP) ....................................... 2001-348061

(51) Int. Cl.[7] ............................................... C08F 214/18

(52) U.S. Cl. ........................... 526/250; 526/78; 526/81; 526/234; 526/915; 526/919

(58) Field of Search ........................... 526/250, 81, 78, 526/915, 234, 919

(56) References Cited

U.S. PATENT DOCUMENTS 3,110,704 A * 11/1963 Haliiwell ..................... 526/66
4,473,689 A * 9/1984 Login et al. .................. 526/81
4,692,493 A * 9/1987 Sulzbach et al. ........... 524/805
4,739,008 A * 4/1988 Robinson et al. ........... 524/801
4,748,217 A * 5/1988 Malhotra ...................... 526/81
4,908,410 A * 3/1990 Malhotra .................... 525/276
4,954,562 A * 9/1990 Anderson ................... 524/779

FOREIGN PATENT DOCUMENTS

GB 689400 3/1953
GB 761327 11/1956

OTHER PUBLICATIONS

Gould, Edwin S., Book: Inorganic Reactions and Structure. 1962 edition, Holt, Reinhart and Winston N.Y. see p. 84.*
CRC Handbook of Chemistry and Physics, Ed. 56$^{th}$, Robert C. Weast, Ph.D. (2 pp.) see p. D–143, (1975).

* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

A process for producing a tetrafluoroethylene polymer, which comprises polymerizing tetrafluoroethylene in an aqueous medium in the presence of a dispersant, a stabilizer and a polymerization initiator, wherein the polymerization initiator is a redox polymerization initiator comprising a halogen acid salt $YXO_3$/a sulfite $Z_2SO_3$ wherein X is a chlorine atom, a bromine atom or an iodine atom, Y is a hydrogen atom, ammonium, an alkali metal or an alkaline earth metal, and Z is ammonium, an alkali metal or an alkaline earth metal. By this process, it is possible to obtain a tetrafluoroethylene polymer which is suitable for a stretching operation after paste extrusion.

18 Claims, No Drawings

PROCESS FOR PRODUCING A TETRAFLUOROETHYLENE POLYMER EXCELLENT IN STRENGTH

The present invention relates to a process for producing a tetrafluoroethylene polymer (hereinafter referred to as PTFE) excellent in strength. Particularly, it relates to a process for producing PTFE excellent in strength, which is suitable for stretching after paste extrusion.

Heretofore, tetrafluoroethylene homopolymer (PTFE) has been obtained by polymerizing tetrafluoroethylene (hereinafter referred to as TEE) while tetrafluoroethylene copolymer has been obtained by polymerizing tetrafluoroethylene together with a copolymerizable modifying monomer, and both have been used for various purposes.

PTFE can be produced by an aqueous dispersion polymerization of TFE and can be obtained in the form of an aqueous dispersion having PTFE particles dispersed, or can be obtained in the form of PTFE fine powder by coagulating the aqueous dispersion polymerization solution, followed by drying.

A conventional PTFE fine powder has a high melt viscosity and does not readily flow at the melting temperature, and thus, it has non-melt processability. Therefore, a paste extrusion is carried out usually in such a manner that a PTFE fine powder is blended with a lubricant, and the lubricated PTFE is extruded. Then, an extruded product obtained by removing the lubricant, is usually fused (sintered) at a temperature higher than the melting of PTFE, to the shape of the final product.

On the other hand, other important products obtained from the PTFE fine powder may, for example, be air permeable fabrics for products such as clothing, tents and separation membranes. These products can be obtained by rapidly stretching in a non-sintered state an extruded product obtained by paste extrusion of a PTFE fine powder, to impart a nature such that steam can permeate, but condensed water can not permeate.

The physical properties required for stretched products obtained by stretching PTFE, have become increasingly high year after year, and even with stretched products obtained by such PTFE, the strength is not sufficient. To solve such problems, various studies have been made with respect to the polymerization method. For example, U.S. Pat. No. 4,016,345 discloses a method of continuously adding an inorganic persulfate initiator at a temperature of from 95 to 125° C., until from 50 to 80% of the total amount of TFE for polymerization has been polymerized. The obtained PTFE has a stretchable property whereby the stretch rate at a speed of 100%/sec., is at least 20 times.

U.S. Pat. No. 4,159,370 discloses a method of using a persulfate initiator and changing the polymerization conditions after the initiation of polymerization, in order to obtain a stretchable PTFE fine powder having an average molecular weight of at least 5,000,000. For example, the polymerization is carried out at a polymerization temperature of from 55 to 85° C., and the polymerization temperature is lowered by 5 to 30° C. during the polymerization. The obtained PTFE has a uniform stretchable property even when the stretch rate is 20 times at a speed of 100%/sec.

U.S. Pat. No. 4,363,900 discloses a dispersion polymerization method for producing a stretchable fine powder. In this method, polymerization is carried out at a temperature of from 55 to 120° C., and during the polymerization, a polymerization inhibitor such as hydroquinone is added, whereby the polymerization time is prolonged to a level of at least 130%. PTFE prepared by this method has a uniform stretchable property at a level of up to 30 times at a speed of 100%/sec. Further, this specification discloses that the PTFE fine powder disclosed in U.S. Pat. No. 4,159,370 has a good stretchability, but it is still difficult to accomplish uniform stretching.

U.S. Pat. No. 4,766,188 discloses a dispersion polymerization method of TFE, wherein ammonium sulfite is added after initiation of the polymerization. PTFE prepared by this method is stretched at a speed of 17%/sec, but the stretch rate is up to 7 times. The standard specific gravity value is as low as 2.149, but the cooling rate employed, is 1.5° C./min, not 1.0° C./min as stipulated in ASTM.

U.S. Pat. Nos. 4,576,869 and 4,654,406 disclose a method wherein addition of a permanganate initiator is stopped near the end of polymerization, whereby the termination time can be prolonged by at least 7% as compared with a case where addition of the initiator is continued to the end of the reaction. PTFE prepared by this method is a stretchable PTFE fine powder. With the obtained PTFE, a stretch uniformity of at least 75% (i.e. a good stretch uniformity) is accomplished by adding 17 mass % of a lubricant and stretching it at least 1,000% within a range of from 10%/sec to 100%/sec. This PTFE has uniform stretchability even though a very low speed of 10%/sec is employed for the evaluation of the stretchability.

JP-A-2000-143707 discloses a polymerization which is initiated at a temperature of not higher than 60° C. and terminated at a temperature higher than 55° C., and the termination temperature is made to be higher by at least 5° C. than the initiation temperature, and the polymerization is terminated in the presence of a liquid stabilizer.

The stretchability of PTFE obtained by the above prior art is practically not yet sufficient, and it is desired to develop PTFE whereby it is possible to obtain a stretched product having a more improved property (such as higher strength).

It is an object of the present invention to provide a process for producing PTFE which is PTFE having stretchability, fibrillation property and non-melt processability, whereby it is possible to obtain a stretched product having an improved property (such as higher strength).

In order to solve the above problems, the present inventors have conducted an extensive study and as a result, have found it possible to solve the above problems by using, as a polymerization initiator, a redox polymerization initiator of a halogen acid salt/a sulfite. The present invention has been accomplished on the basis of this discovery.

Namely, the present invention provides a process for producing a tetrafluoroethylene polymer, which comprises polymerizing tetrafluoroethylene in an aqueous medium in the presence of a dispersant, a stabilizer and a polymerization initiator, wherein the polymerization initiator is a redox polymerization initiator comprising a halogen acid salt $YXO_3$/a sulfite $Z_2SO_3$ wherein X is a chlorine atom, a bromine atom or an iodine atom, Y is a hydrogen atom, ammonium, an alkali metal or an alkaline earth metal, and Z is ammonium, an alkali metal or an alkaline earth metal.

Further, the present invention provides the above process for producing PTFE, wherein both the halogen acid salt and the sulfite of the redox polymerization initiator are added to the polymerization system simultaneously, or either the halogen acid salt or the sulfite is added preliminarily and the other is added intermittently or continuously during the polymerization.

Now, the present invention will be described in detail with reference to the preferred embodiments.

In the polymerization process of TFE of the present invention, as the polymerization initiator, a redox polymerization initiator comprising a combination of a halogen acid salt and a sulfite, is used.

The halogen acid salt is one represented by $YXO_3$, and the sulfite is one represented by $Z_2SO_3$. In the formulae, X is a chlorine atom, a bromine atom or an iodine atom, Y is a hydrogen atom, ammonium, an alkali metal or an alkaline earth metal, and Z is ammonium, an alkali metal or an alkaline earth metal.

Among such redox polymerization initiators, a redox polymerization initiator comprising a combination of a bromate and a sulfite, is preferred, and a redox polymerization initiator comprising a combination of potassium bromate and ammonium sulfite, is most preferred.

By means of the above redox polymerization initiator, it is possible to obtain PTFE having a low standard specific gravity (hereinafter referred to as SSG), a low extrusion pressure and a high break strength.

When the redox polymerization initiator is employed, both the halogen acid salt and the sulfite may be added simultaneously or sequentially to the polymerization system. It is preferred that either one is preliminarily charged into the autoclave, and then the other is intermittently or continuously added during the polymerization. It is most preferred to preliminarily charge the halogen acid salt to the autoclave, and then intermittently or continuously add the sulfite.

The amount of the redox polymerization initiator comprising a combination of the halogen acid salt and the sulfite, may be optionally selected, but it is preferably from 1 to 600 ppm, more preferably from 1 to 300 ppm, still more preferably from 1 to 100 ppm, based on the mass of water. As the amount of the polymerization initiator is small, it tends to be possible to obtain PTFE having a smaller standard specific gravity i.e. a larger average molecular weight, such being preferred. Further, if the amount of the polymerization initiator is too small, the polymerization rate tends to be too slow. On the other hand, if it is too large, SSG of the resulting PTFE tends to be high. The polymerization temperature is usually within a range of from 50 to 120° C., preferably within a range of from 60 to 100° C. The polymerization pressure may be suitably selected, but it is preferably within a range of from 0.5 to 4.0 MPa, more preferably within a range of from 1.0 to 2.5 MPa.

The dispersant is preferably an anionic surfactant having a less chain transfer property, particularly preferably a surfactant of a fluorocarbon type. Specific examples include $ZC_nF_{2n}COOM$ (wherein Z is a hydrogen atom, a chlorine atom, a fluorine atom or $(CF_3)_2CF$, M is a hydrogen atom, ammonium or an alkali metal, and n is an integer of from 6 to 12), $C_mF_{2m+1}O(CF(CF_3)CF_2O)_pCF(CF_3)COOM$ (wherein M is a hydrogen atom, ammonium or an alkali metal, m is an integer of from 1 to 12, and p is an integer of from 0 to 5), $C_nF_{2n+1}SO_3M$, and $C_nF_{2n+1}CH_2CH_2SO_3M$. A surfactant of a perfluorocarbon type is more preferred, and $C_7F_{15}COONH_4$, $C_8F_{17}COONH_4$, $C_9F_{19}COONH_4$, $C_{10}F_{21}COONH_4$, $C_7F_{15}COONa$, $C_8F_{17}COONa$, $C_9F_{19}COONa$, $C_7F_{15}COOK$, $C_8F_{17}COOK$, $C_9F_{19}COOK$, $C_3F_7O\ (CF\ (CF_3)\ CF_2O)_2CF\ (CF_3)\ COONH_4$, etc. may be mentioned. These surfactants may be used alone or in combination as a mixture of two or more of them. The amount of the dispersant is preferably within a range of from 250 to 5,000 ppm, based on the mass of water to be used. Within this range, the stability of the aqueous dispersion will be improved, and the break strength of the resulting PTFE will be high. In order to further improve the stability of the aqueous dispersion, it is preferred to reduce the amount of the dispersant. The amount of the dispersant is particularly preferably within a range of from 250 to 500 ppm, based on the mass of water to be used. Further, it is also preferred to add the dispersant during the polymerization. The method for such additional addition may be a method of adding continuously or dividedly in a few times. Timing for the post addition can not generally be defined, as it varies depending also on the amount of the dispersant initially charged, but the timing for addition is required to be quick, as the amount of the dispersant initially charged, is large.

The polymerization process is preferably carried out in the presence of a stabilizer. The stabilizer is preferably, for example, paraffin wax, a fluorinated oil, a fluorinated solvent or silicone oil. These stabilizers may be used alone or in combination as a mixture of two or more of them. It is particularly preferred to carry out the polymerization in the presence of paraffin wax. The paraffin wax may be one which is liquid, semi-liquid or solid at room temperature and is preferably a saturated hydrocarbon having a carbon number of at least 12. The melting point of the paraffin wax is usually preferably from 40 to 65° C., more preferably from 50 to 65° C. The amount of the paraffin wax is preferably from 0.1 to 12 mass %, more preferably from 0.1 to 8 mass %, based on the mass of water to be used.

The polymerization process is carried out usually by gently stirring the aqueous polymerization mixture. The stirring condition is controlled so that the PTFE dispersed particles in the formed aqueous dispersion will not coagulate. The aqueous dispersion polymerization is carried out usually until the concentration of the PTFE dispersed particles in the aqueous dispersion will be from 15 to 40 mass %.

The aqueous dispersion polymerization is preferably carried out under an acidic condition by an addition of an acid, for the stabilization of the aqueous dispersion. As the acid, an acid such as sulfuric acid, hydrochloric acid or nitric acid is preferred, and nitric acid is more preferred. By the addition of nitric acid, the stability of the aqueous dispersion will further be improved.

The method for polymerization of TFE of the present invention may be polymerization for a homopolymer of TFE or polymerization for a copolymer of TFE with a copolymerizable modifying monomer such as a fluorinated monomer other than TFE. The fluorinated monomer may, for example, be hexafluoropropylene, perfluorobutene-1, perfluorohexene-1, perfluorononene-1, perfluoro(methyl vinyl ether), perfluoro(ethyl vinyl ether), perfluoro(propyl vinyl ether), perfluoro(heptyl vinyl ether), (perfluoromethyl) ethylene, (perfluorobutyl)ethylene or chlorotrifluoroethylene. These fluorinated monomers may be used alone or in combination as a mixture of two or more of them. The copolymerizable modifying monomer is usually preferably at most 1 mass %, more preferably at most 0.5 mass %. By the aqueous dispersion polymerization, a PTFE aqueous dispersion is obtainable, and the particle sizes of the PTFE dispersed particles in the aqueous dispersion usually have a wide distribution of from 0.02 to 1.0 μm, and the average particle diameter is from about 0.1 to 0.4 μm.

From the obtained aqueous dispersion polymerization solution, PTFE dispersed particles are coagulated and dried to obtain a PTFE fine powder. As the coagulation method, it is preferred to stir the aqueous dispersion at a high speed to coagulate PTFE dispersed particles. At that time, it is preferred to add a precipitating agent. The precipitating agent is preferably ammonium carbonate, a polybasic inorganic salt, a mineral acid, a cationic surfactant or an alcohol, and ammonium carbonate is more preferred.

PTFE obtained by the process of the present invention, has stretchability, fibrillation property and non-melt processability. These properties are properties which are usually required for paste extrusion.

Further, PTFE obtained by the process of the present invention has a standard specific gravity and a break strength within certain specific ranges and is thereby characterized.

SSG of PTFE obtained by the process of the present invention is at most 2.160, preferably at most 2.157. SSG is an index of the average molecular weight, and SSG of PTFE of the present invention has a very small value, which indicates a high average molecular weight. SSG tends to decrease as the average molecular weight increases. Namely, PTFE of the present invention has a small SSG value, whereby it is expected that the average molecular weight is fairly high. PTFE having a SSG value of at most 2.160 will have a stretching ratio of an extruded product exceeding 3,000%, and is excellent also in stretch uniformity.

The break strength of a stretched product of PTFE obtained by the process of the present invention is within a range of from 32.0N (3.26 kgf) to 49.0N (5.0 kgf), preferably within a range of 34.3N (3.5 kgf) to 49.0N (5.0 kgf). Surprisingly, this PTFE has a higher break strength than PTFE disclosed in JP-A-2000-143727. The higher the break strength, the better the durability, etc., such being desirable. On the other hand, PTFE having a break strength exceeding 49.0N (5.0 kgf) tends to be practically very difficult to produce.

Further, PTFE obtained by the process of the present invention preferably has an extrusion pressure of from 9.8 MPa (100 kgf/cm$^2$) to 24.5 MPa (250 kgf/cm$^2$), more preferably from 9.8 MPa (100 kgf/cm $^2$) to 19.6 MPa (200 kgf/cm$^2$).

PTFE obtained by the process of the present invention preferably has a stress relaxation time of at least 650 sec., more preferably at least 700 sec., particularly preferably at least 730 sec.

Now, the present invention will be described in further detail with reference to Examples. However, it should be understood that the present invention is by no means restricted by such specific Examples. In the following, "parts" means "parts by mass". Examples 1 to 4 represent the present invention, and Example 5 represents a Comparative Example.

In the following Examples, evaluation of stretchability, and measurement of the break strength and stress relaxation time, were carried out by the following methods.

(1) Evaluation of Extrusion Pressure and Stretchability 100 g of PTFE fine powder left to stand at room temperature for at least 2 hours, was put into a glass bottle having an internal capacity of 900 cc, and 21.7 g of a lubricant Isoper H (tradename, manufactured by Exxon) was added, followed by stirring for 3 minutes to obtain a PTFE mixture. The obtained PTFE mixture was left to stand for 2 hours in a 25° C. constant oven and then subjected to paste extrusion through an orifice having a diameter of 2.5 cm, a land length of 1.1 cm and an introduction angle of 30° at 25° C. under conditions such that the reduction ratio (the ratio of the cross-sectional area of the inlet to the cross-sectional area of the outlet, of the die) was 100, and the extrusion speed was 51 cm/min, to obtain a beading. The pressure required for the extrusion at that time was measured and taken as the extrusion pressure. The obtained beading was dried at 230° C. for 30 minutes to remove the lubricant. Then, the beading was cut into a proper length, and each terminal was secured so that the distance between clamps became either 3.8 cm or 5.1 cm, followed by heating at 300° C. Then, stretching was carried out at a prescribed speed until the distance between the clamps became a prescribed distance. This stretching method was substantially in accordance with the method disclosed in U.S. Pat. No. 4,576,869, except that the extrusion speed (51 cm/min) is different. "Stretching" means an increase in the length and is usually represented in connection with the initial length.

(2) Measurement of Break Strength

The sample for the break strength test was prepared by stretching the beading in the same manner as in the evaluation of the stretchability under such conditions that the clamp distance was 5.1 cm, the stretching speed was 100%/sec and the total stretching was 2,400%. The break strength was measured as the minimum tensile break load (force) among three samples obtained from the stretched beading i.e. one from each terminal of the stretched beading (if neck down was observed within the range of clamps, such was excluded) and one from the center thereof. The sample was pinched and secured by movable jaws having a gauge length of 5.0 cm, and the movable jaws were driven at a speed of 300 mm/min, whereby the measurement was made at room temperature by means of a tensile tester (manufactured by A and D Co.).

(3) Measurement of Stress Relaxation Time

The sample for measurement of the stress relaxation time was prepared by stretching the beading in the same manner as in the evaluation of the stretchability under such conditions that the clamp distance was 3.8 cm, the stretching speed was 1,000%/sec, and the total stretching was 2,400%. Both terminals of the sample of this stretched beading were secured by fixtures, and the sample was tensioned to have the total length of 25 cm. The stress relaxation time is a time required for breakage when this sample was left to stand in an oven of 390° C. This temperature corresponds to a temperature higher than 380° C. for melting of an extended chain shape as disclosed in U.S. Pat. No. 5,470,655. The sample secured by the fixtures is inserted into the oven through a (covered) slot at the side of the oven, whereby the temperature of the sample will not decrease during the setting of the sample. Therefore, no extra time is required for recovery as disclosed in U.S. Pat. No. 4,576,869.

EXAMPLE 1

Into a 100 l autoclave, 928 g of paraffin wax, 55 l of ultra pure water, 36 g of ammonium perfluorooctanoate, 1 g of succinic acid, 8 ml of a 1N nitric acid aqueous solution and 0.4 g of potassium bromate, were charged.

After carrying out nitrogen purge and deaeration, the temperature was raised to 65° C. After the temperature was stabilized, TFE was introduced to a pressure of 1.9 MPa. With stirring the content, 1 l of an aqueous solution containing 140 ppm of ammonium sulfite was continuously added for 60 minutes to initiate the polymerization. As the polymerization proceeded, TFE was consumed, and the pressure in the autoclave decreased. Accordingly, in order to maintain the pressure to be constant, TFE was continuously supplied. After completion of the addition of ammonium sulfite, 1 l of an aqueous solution containing 11.1 mass % of ammonium perfluorooctanoate, was added. Upon expiration of 270 minutes from the initiation of the polymerization, stirring and supply of TFE were stopped, and TFE in the autoclave was purged. Then, the gas phase was substituted by nitrogen. The obtained PTFE aqueous dispersion containing 28.9 mass % of a solid content, was coagulated in the presence of ammonium carbonate, and the coagulated PTFE, was separated from the liquid, and was dried at 160° C. to obtain a PTFE fine powder. And, SSG and the average particle diameter of the obtained PTFE fine powder were measured. Further, the obtained PTFE fine powder was subjected to paste extrusion by the above-mentioned method to obtain a beading. The extrusion pressure at that time was measured. Then, the beading was stretched, and the break strength and stress relaxation time of the stretched beading, were measured.

Then, 600 g of the PTFE fine powder was put into a glass bottle, and 20 mass % of Isoper G (manufactured by Exxon) was added as a lubricant, followed by rotation at a speed of 100 rpm for 30 minutes for mixing. The blended PTFE was aged at room temperature for 24 hours. This PTFE was pressed for 120 seconds under a pressure of 0.2 MPa, to obtain a preform having a diameter of 68 mm. This preform was extruded through an orifice having a diameter of 11 mm, and the extruded product was rolled to a thickness of 0.1 mm. The rolled sheet is formed into a strip shape having a length of 5 cm and width of 2 cm, which was stretched 10 times at a rate of 100%/sec at a temperature of 300° C. The obtained film had a porosity of 90%.

EXAMPLE 2

Into a 100 l autoclave, 928 g of paraffin wax, 55 l of ultra pure water, 36 g of ammonium perfluorooctanoate, 1 g of succinic acid, 8 ml of a 1N nitric acid aqueous solution and 0.4 g of potassium bromate, were charged. After carrying out nitrogen purge and deaeration, the temperature was raised to 85° C. After the temperature was stabilized, TFE was introduced to a pressure of 1.9 MPa. With stirring the content, 1 l of an aqueous solution containing 140 ppm of ammonium sulfite was continuously added for 60 minutes to initiate polymerization. As the polymerization proceeded, TFE was consumed, and the pressure in the autoclave decreased. Accordingly, in order to maintain the pressure to be constant, TFE was continuously supplied. After completion of the addition of ammonium sulfite, 1 l of an aqueous solution containing 11.1 mass % of ammonium perfluorooctanoate, was added. Upon expiration of 270 minutes from the initiation of the polymerization, stirring and supply of TFE were stopped, and TFE in the autoclave was purged. Then, the gas phase was replaced by nitrogen. The obtained PTFE aqueous dispersion containing 29.6 mass % of a solid content, was coagulated in the presence of ammonium carbonate, and the coagulated PTFE was separated from the liquid, and was dried at 250° C. to obtain a PTFE fine powder. In the same manner as in Example 1, SSG and the average particle diameter of the PTFE fine powder, the extrusion pressure at the time of paste extrusion, and the break strength and stress relaxation time of the stretched beading, were measured.

EXAMPLE 3

Into a 100 l autoclave, 928 g of paraffin wax, 55 l of ultra pure water, 25 g of ammonium perfluorooctanoate, 1 g of succinic acid, 8 ml of a 1N nitric acid aqueous solution and 0.4 g of potassium bromate, were charged. After carrying out nitrogen purge and deaeration, the temperature was raised to 85° C. After the temperature was stabilized, TFE was introduced to a pressure of 1.9 MPa. With stirring the content, 1 l of an aqueous solution containing 140 ppm of ammonium sulfite was continuously added for 60 minutes to initiate polymerization. As the polymerization proceeded, TFE was consumed, and the pressure in the autoclave decreased. Accordingly, in order to maintain the pressure to be constant, TFE was continuously supplied. After completion of the addition of ammonium sulfite, 1 l of an aqueous solution containing 11.1 mass % of ammonium perfluorooctanoate was added. Upon expiration of 250 minutes from the initiation of the polymerization, stirring and supply of TFE were stopped, and TFE in the autoclave was purged. Then, the gas phase was substituted by nitrogen. The obtained PTFE aqueous dispersion containing 24.1 mass % of a solid content, was coagulated in the presence of ammonium carbonate, and the coagulated PTFE was separated from the liquid and was dried at 250° C. to obtain a PTFE fine powder. In the same manner as in Example 1, SSG and the average particle diameter of the PTFE fine powder, the extrusion pressure at the time of paste extrusion, and the break strength and stress relaxation time of a stretched beading, were measured.

EXAMPLE 4

Into a 100 l autoclave, 928 g of paraffin wax, 55 l of ultra pure water, 25 g of ammonium perfluorooctanoate, 1 g of succinic acid, 8 ml of a 1N nitric acid aqueous solution and 6 g of potassium bromate, were charged. After carrying out nitrogen purge and deaeration, the temperature was raised to 85° C. After the temperature was stabilized, TFE was introduced to a pressure of 1.2 MPa. With stirring the content, 0.4 l of an aqueous solution containing 300 ppm of ammonium sulfite was continuously added for 80 minutes to initiate polymerization. As the polymerization proceeded, TFE was consumed, and the pressure in the autoclave decreased. Accordingly, in order to maintain the pressure to be constant, TFE was continuously supplied. Upon expiration of 60 minutes after the initiation of the polymerization, 1 l of an aqueous solution containing 3.6 mass % of ammonium perfluorooctanoate, was added. Further, after completion of the addition of ammonium sulfite, 1 l of an aqueous solution containing 8.1 mass % of ammonium perfluorooctanoate was again added. Upon expiration of 220 minutes from the initiation of the polymerization, stirring and supply of TFE were stopped, and TFE in the autoclave, was purged. Then, the gas phase was replaced by nitrogen. The obtained PTFE aqueous dispersion containing 26.0 mass % of a solid content, was coagulated in the presence of ammonium carbonate, and the coagulated PTFE was separated from the liquid and was dried at 200° C. to obtain a PTFE fine powder. In the same manner as in Example 1, SSG and the average particle diameter of the PTFE fine powder, the extrusion pressure at the time of paste extrusion, and the break strength and stress relaxation time of the stretched beading, were measured.

EXAMPLE 5

Into a 100 l autoclave, 736 g of paraffin wax, 59 l of ultra pure water and 33 g of ammonium perfluorooctanoate, were charged. The temperature was raised to 70° C., and after carrying out nitrogen purge and deaeration, TFE was introduced to a pressure of 1.9 MPa. With stirring, 1 l of an aqueous solution containing 0.5 mass % of disuccinic acid peroxide was injected to initiate polymerization. As the polymerization proceeded, TFE was consumed, and the pressure in the autoclave decreased. Accordingly, in order to maintain the pressure to be constant, TFE was continuously supplied during the polymerization. The temperature was raised to 90° C. at a rate of 6° C./hr after 15 minutes from the initiation of the polymerization. Further, when the supply of TFE reached 6.6 kg, 1 l of an aqueous solution containing 5.6 mass % of ammonium perfluorooctanoate was added. Upon expiration of 160 minutes from the initiation of the polymerization, stirring and supply of TFE were stopped, and TFE in the autoclave was purged to terminate the polymerization. The obtained PTFE aqueous dispersion containing 24.3 mass % of a solid content, was coagulated, and the coagulated PTFE was separated from the liquid and was dried at 205° C. to obtain a PTFE fine powder. In the same manner as in Example 1, SSG and the average particle diameter of the PTFE fine powder, the extrusion pressure at the time of paste extrusion, and the break strength and stress relaxation time of the stretched beading, were measured.

TABLE 1

| Measured items | Ex. 1 | Ex. 2 | Ex. 3 | Ex. 4 | Ex. 5 |
|---|---|---|---|---|---|
| SSG | 2.148 | 2.150 | 2.154 | 2.154 | 2.155 |
| Average particle diameter (μm) | 483 | 473 | 538 | 494 | 478 |
| Extrusion pressure (MPa) | 20.6 | 22.2 | 17.3 | 18.3 | 17.7 |
| Porosity (%) | 90 | — | — | — | — |
| Stress relaxation time (sec) | 741 | 730 | 706 | 660 | 520 |
| Breaking strength (N) | 37.3 | 44.3 | 34.8 | 34.3 | 9.8 |

PTFE obtained by the process of the present invention has a low standard specific gravity and is excellent in break strength, and it can be used suitably for a stretching operation after paste extrusion.

The entire disclosures of Japanese Patent Application No. 2001-86829 filed on Mar. 26, 2001, and Japanese Patent Application No. 2001-348061 filed on Nov. 13, 2001 including specifications, claims and summaries are incorporated herein by reference in their entireties.

What is claimed is:

1. A process for producing a tetrafluoroethylene polymer, comprising:

polymerizing tetrafluoroethylene in an aqueous medium in the presence of a dispersant, a stabilizer and a polymerization initiator;

wherein the polymerization initiator is a redox polymerization initiator comprising potassium bromate/ammonium sulfite.

2. The process for producing a tetrafluoroethylene polymer according to claim 1, wherein both the potassium bromate and the ammonium sulfite of the redox polymerization initiator are added to the polymerization system simultaneously, or either the potassium bromate or the ammonium sulfite is added preliminarily and the other is added intermittently or continuously during the polymerization.

3. The process for producing a tetrafluoroethylene polymer according to claim 1, wherein the potassium bromate is preliminarily added to the polymerization system, and the ammonium sulfite is intermittently or continuously added during the polymerization.

4. The process for producing a tetrafluoroethylene polymer according to claim 1, wherein potassium bromate is preliminarily added to the polymerization system, and ammonium sulfite is intermittently or continuously added during the polymerization.

5. The process for producing a tetrafluoroethylene polymer according to claim 1, wherein the polymerization initiator is used in an amount of from 1 to 600 ppm, respectively, based on the mass of water.

6. The process for producing a tetrafluoroethylene polymer according to claim 1, wherein the polymerization initiator is used in an amount of from 1 to 300 ppm, respectively, based on the mass of water.

7. The process for producing a tetrafluoroethylene polymer according to claim 1, wherein the polymerization initiator is used in an amount of from 1 to 100 ppm, respectively, based on the mass of water.

8. The process for producing a tetrafluoroethylene polymer according to claim 1, wherein the dispersion comprises a fluorocarbon surfactant.

9. The process according to claim 8, wherein said fluorocarbon surfactant is a perfluorocarbon surfactant.

10. The process for producing a tetrafluoroethylene polymer according to claim 1, wherein the stabilizer is paraffin wax.

11. The process according to claim 10, wherein an amount of said paraffin wax is from 0.1 to 12 mass %, based on the mass of water of said aqueous medium.

12. The process according to claim 1, wherein a polymerization temperature is from 50 to 120° C.

13. The process according to claim 1, wherein a polymerization pressure is from 0.5 to 4.0 MPa.

14. The process according to claim 1, wherein an amount of said dispersant is from 250 to 5,000 ppm, based on the mass of water of said aqueous medium.

15. The process according to claim 1, wherein said polymerizing is carried out until a concentration of tetrafluorethylene dispersed particles in said aqueous medium is from 15 to 40 mass %.

16. The process according to claim 1, wherein said polymerizing is carried out under an acidic condition.

17. The process according to claim 1, wherein said tetrafluoroethylene is polymerized alone or together with a comonomer.

18. The process according to claim 17, wherein an amount of said comonomer is at most 1 mass %.

* * * * *